United States Patent
Orschel et al.

(10) Patent No.: US 9,727,045 B2
(45) Date of Patent: Aug. 8, 2017

(54) METHOD AND SYSTEM FOR A META-RECIPE CONTROL SOFTWARE ARCHITECTURE

(71) Applicant: SunEdison Semiconductor Limited (UEN201334164H), St. Peters, MO (US)

(72) Inventors: Benno Orschel, Saint Louis, MO (US); Mike Wolfram, Dachwig (DE)

(73) Assignee: SUNEDISON SEMICONDUCTOR LIMITED (UEN201334164H), Singapore (SG)

( * ) Notice: Subject to any disclaimer, the term of this patent is extended or adjusted under 35 U.S.C. 154(b) by 776 days.

(21) Appl. No.: 14/136,011

(22) Filed: Dec. 20, 2013

(65) Prior Publication Data

US 2014/0188269 A1  Jul. 3, 2014

Related U.S. Application Data

(60) Provisional application No. 61/747,730, filed on Dec. 31, 2012.

(51) Int. Cl.
*G06F 19/00* (2011.01)
*G05B 19/418* (2006.01)
(Continued)

(52) U.S. Cl.
CPC ....... *G05B 19/0426* (2013.01); *G05B 19/418* (2013.01); *G05B 2219/32096* (2013.01); *G05B 2219/32097* (2013.01); *G05B 2219/45031* (2013.01); *Y02P 90/02* (2015.11); *Y02P 90/20* (2015.11)

(58) Field of Classification Search
CPC .............. G05B 15/02; G05B 19/41865; G05B 19/41875; G06N 99/005; Y02P 90/20; Y02P 90/22; Y02P 90/12; Y02P 90/18
See application file for complete search history.

(56) References Cited

U.S. PATENT DOCUMENTS 6,233,492 B1  5/2001  Nakamura et al.
6,263,255 B1  7/2001  Tan et al.
(Continued)

OTHER PUBLICATIONS

Garrison et al., The need for application-aware access control evaluation, Sep. 2012, 11 pages.*

*Primary Examiner* — Thuy Dao
(74) *Attorney, Agent, or Firm* — Armstrong Teasdale LLP (57) ABSTRACT

A method and system for computerized coordination of multiple operations to be performed by components of machines are provided. The computer system includes a memory device for storing data and a computer-controlled machine that includes a processor in communication with the memory device wherein the processor is programmed to read a recipe file from the memory device, the recipe file including operating parameter values for controlling the operation of the machine, extract a name of a meta-recipe file from the recipe file, the meta-recipe file including a first portion including parameter properties of operating parameter values used by the meta-recipe file, receive values for the meta-recipe having the parameter properties specified in the first portion, and operate the machine using code from a second portion of the meta-recipe and the received values.

17 Claims, 8 Drawing Sheets

(51) Int. Cl.
*G06F 17/00* (2006.01)
*G05B 19/042* (2006.01)

(56) References Cited

U.S. PATENT DOCUMENTS

| | | |
|---|---|---|
| 6,446,192 B1 | 9/2002 | Narasimhan et al. |
| 6,651,755 B1 | 11/2003 | Kelpe |
| 6,732,007 B1 | 5/2004 | Pasadyn et al. |
| 6,745,086 B1 | 6/2004 | Pasadyn et al. |
| 6,970,758 B1 * | 11/2005 | Shi .................. G05B 15/02 700/108 |
| 7,123,980 B2 | 10/2006 | Funk et al. |
| 7,133,788 B2 | 11/2006 | Shen et al. |
| 7,369,913 B2 * | 5/2008 | Heminway ...... G05B 19/41865 700/100 |
| 7,672,747 B2 | 3/2010 | Huang et al. |
| 7,684,887 B2 * | 3/2010 | Behrisch .......... G05B 19/41875 700/109 |
| 8,295,963 B2 | 10/2012 | Huang et al. |
| 8,606,379 B2 * | 12/2013 | Marruchella .... G05B 19/41835 700/100 |
| 9,008,814 B2 * | 4/2015 | Pettus .............. G05B 19/41835 700/105 |
| 9,058,033 B2 * | 6/2015 | Tockert ................ C21B 5/008 |
| 2008/0235624 A1 * | 9/2008 | Murata ............... G06F 3/04842 715/825 |
| 2009/0125906 A1 * | 5/2009 | Moore, Jr. ....... G05B 19/41865 718/101 |
| 2010/0082132 A1 * | 4/2010 | Marruchella .... G05B 19/41835 700/86 |
| 2013/0166068 A1 | 6/2013 | Yanagita et al. |
| 2016/0282856 A1 * | 9/2016 | Wachs ............. G05B 19/41875 |

\* cited by examiner

METHOD AND SYSTEM FOR A META-RECIPE CONTROL SOFTWARE ARCHITECTURE

CROSS REFERENCE TO RELATED APPLICATIONS

This application claims priority to and the benefit of the filing date of U.S. Provisional Application No. 61/747,730 filed on Dec. 31, 2012, which is hereby incorporated by reference in its entirety.

BACKGROUND

The field relates generally to computerized control of machines, and more particularly to computerized coordination of multiple operations to be performed by components of machines.

Complex machines, such as those found in a silicon wafer manufacturing plant or other industrial plant, often include multiple components whose operations must be precisely orchestrated to produce a product properly. Often, not only must the multiple components of a given machine work in concert, interactions between different machines must be coordinated as well. The components can include valves, motors, heaters, fans, and sensors, to name a few. To properly make a product pursuant to certain specifications set by an engineer, raw materials might undergo a multitude of processes as they transition into an intermediate product and finally a finished product. The processes might involve, for example, heating silicon in a crucible, extracting the silicon from the crucible at a specific rate and temperature to form a crystal, and partitioning the crystal into wafers. Other processes might include vapor deposition and etching of a wafer of silicon. In other industrial plants, similarly complex processes are carried out.

Rather than relying on human operators to individually control each machine used in processes like those described above, a computerized control server which is communicatively coupled to the components of the various machines monitors the status of each machine and issues instructions to the machine components to generate a product from the raw materials. Commonly known control software applications provide one of a plurality of types of recipe structure, controlling process execution according to a given process functionality that is manifest in the program code of the application. Recipes contain parameter values and flags that are editable by the user. When such a recipe is read, the program code reads the recipe parameters and accordingly runs the process within the boundaries of given program functionality.

Such architecture, however, has disadvantages. For example, whenever some code improvement which also requires a change in recipe structure is introduced to the existing program, all old recipes must be updated to the new format. After changing to the new code, all recipes of the old format are obsolete.

This situation presents risks, particularly in high-volume production environments such as silicon wafer production. In cases this may be tolerable, whereby the old capabilities are completely being replaced by better, but different ones. It often may require some form of process re-qualification for all established processes, whether or not all of them actually benefit from the change.

In a typical production environment it would be best, if all processes that don't actually benefit from a code change could keep running with the old code and old recipes, while new processes requiring the change would run with the new code and new recipe structure side by side.

Unfortunately, common control software architecture does not permit such a scenario. Typically there is an either/or situation regarding which code version and which recipe structure is running.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a computer system for computerized coordination of multiple operations to be performed by components of machines includes a memory device for storing data and a computer-controlled machine that includes a processor in communication with the memory device wherein the processor is programmed to read a recipe file from the memory device, the recipe file including operating parameter values for controlling the operation of the machine, extract a name of a meta-recipe file from the recipe file, the meta-recipe file including a first portion including parameter properties of operating parameter values used by the meta-recipe file, receive values for the meta-recipe having the parameter properties specified in the first portion, and operate the machine using code from a second portion of the meta-recipe and the received values.

In another aspect, a computer-based method of operating a machine using an embedded script engine includes reading, by the computer device, a recipe file from the memory, the recipe file including operating parameter values for controlling the operation of the machine, extracting, by the computer device, a name of a meta-recipe file from the recipe file, the meta-recipe file including a first portion including parameter properties of operating parameter values used by the meta-recipe file, receiving values for the meta-recipe having the parameter properties specified in the first portion, and operating the machine using code from a second portion of the meta-recipe and the received values.

In yet another aspect, one or more non-transitory computer-readable storage media have computer-executable instructions embodied thereon, wherein when executed by at least one processor, the computer-executable instructions cause the processor to read a recipe file from a memory associated with the processor, the processor configured to control an operation of the machine, the recipe file including operating parameter values for controlling the operation of the machine. The computer-executable instructions further cause the processor to extract a name of a meta-recipe file from the recipe file wherein the meta-recipe file includes a first portion including parameter properties of operating parameter values used by the meta-recipe file. The computer-executable instructions further cause the processor to receive values for the meta-recipe having the parameter properties specified in the first portion and operate the machine using code from a second portion of the meta-recipe and the received values.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIGS. 1-8 show embodiments of the method and apparatus described herein.

DETAILED DESCRIPTION

The following detailed description illustrates embodiments by way of example and not by way of limitation. It is contemplated that the disclosure has general application to analytical and methodical embodiments of using embedded scripts to facilitate operating controlled machines in industrial, commercial, and residential applications, among other applications.

Figure 1:
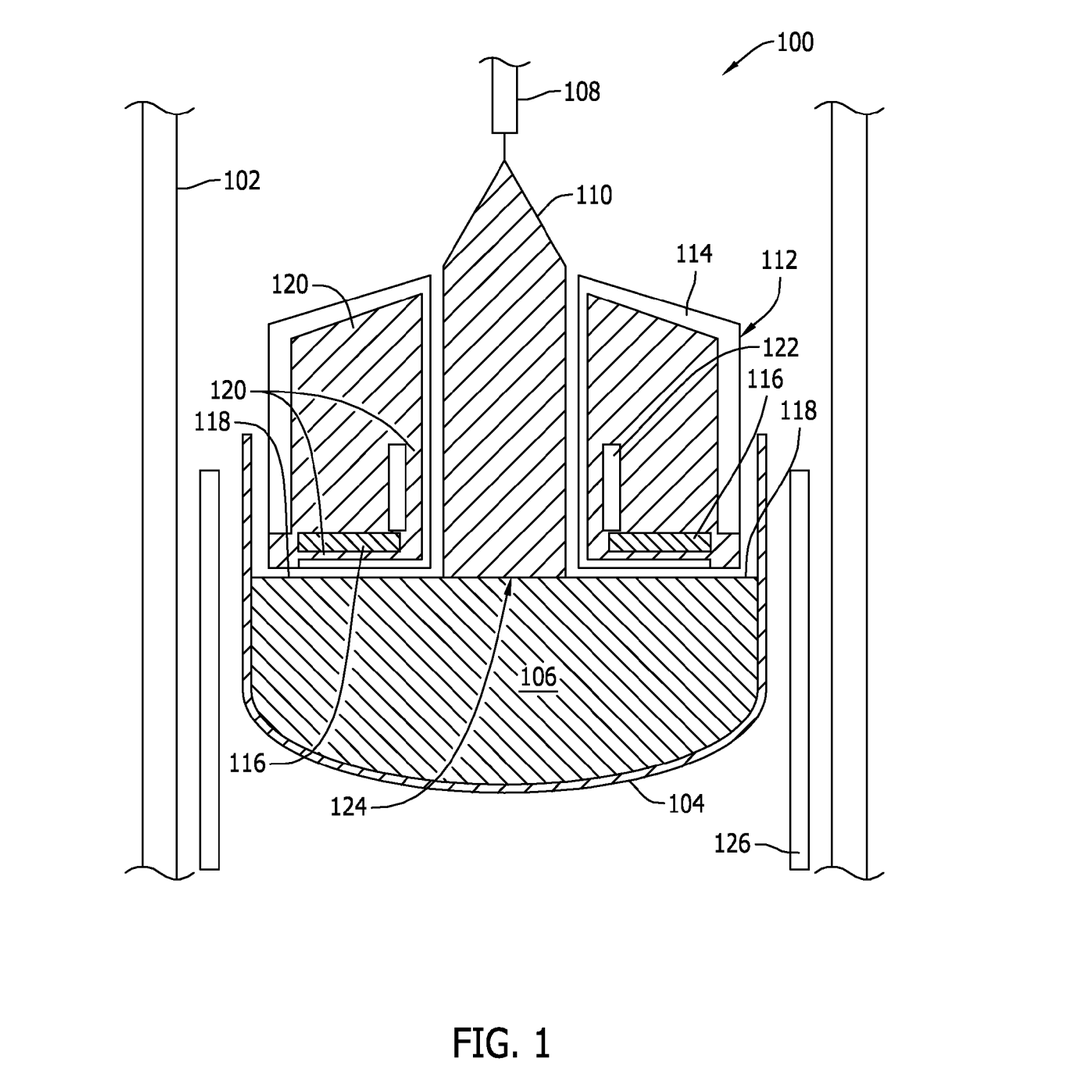
FIG. 1 is a diagram of a crystal puller, which may be controlled by a control server in accordance with an embodiment of this disclosure.

FIG. 1 is a diagram of a crystal puller 100, which may be controlled by a control server in accordance with an embodiment of the disclosure. Crystal puller 100 is used to grow monocrystalline ingots according to the Czochralski method. The Czochralski method is known to those skilled in the art of forming monocrystalline ingots. Crystal puller 100 includes a housing 102, and a quartz crucible 104 in the housing 102 for containing a semiconductor melt 106. The melt contains, for example, silicon. A pulling mechanism 108, such as a shaft or pull wire, secured in housing 102 and adapted to extend toward crucible 104, is adapted to continuously pull a solid monocrystalline ingot or crystal 110 from melt 106. A tubular graphite reflector 112 secured in a growth chamber of housing 102 includes a cover 114 preferably made of graphite and having a central opening sized and shaped for surrounding the growing crystal 110. An annular melt heat exchanger 116 is mounted within cover 114 to face the exposed melt surface 118.

Melt heat exchanger 116 includes a heat source such as an electrically-powered heater. Melt heat exchanger 116 may also include a heat absorption structure. Insulation 120 is disposed between melt heat exchanger 116 and melt surface 118 to inhibit heat transfer between melt surface 118 and melt heat exchanger 116. A crystal heat exchanger 122 is also mounted within cover 114 to surround and to face the growing crystal 110. Crystal heat exchanger 122 is disposed above melt heat exchanger 116 as close to the melt/crystal interface 124 as practical, such that crystal heat exchanger 122 cools a segment of crystal 110 proximate the interface 124. Crystal heat exchanger 122 is cooled by conventional cooling fluid, for example, water. Crystal heat exchanger 122 also includes a heater for controlling the temperature of the cooling fluid. Additionally, a side heater 126 is located adjacent crucible 104 for heating crucible 104. A control server in accordance with embodiments of the present disclosure may be used to set temperatures of melt heat exchanger 116, crystal heat exchanger 122, and side heater 126. Further, a control server in accordance with embodiments of the present disclosure may control the rate at which pull mechanism 108 pulls crystal 110 from melt 106.

Figure 2:
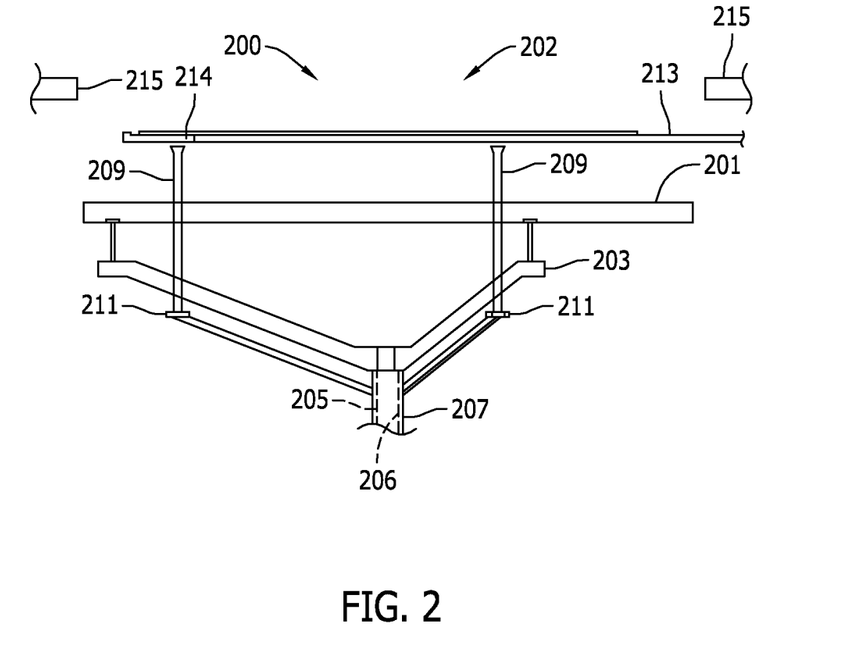
FIG. 2 is a diagram of components included in an epitaxial reactor, which may be controlled by a control server in accordance with an embodiment.

FIG. 2 is a diagram of components included in an epitaxial reactor 200, which may be controlled by a control server in accordance with an embodiment of the present disclosure. A positioning mechanism 202 within the epitaxial reactor 200 operates to position a silicon wafer during various phases of a chemical vapor deposition processes within a chamber of the epitaxial reactor 200. The wafer may be supported by a susceptor 201. Susceptor 201 is mounted on arms 203, which, in turn, are mounted to a susceptor support shaft 205. Susceptor support shaft 205 is slidingly mounted within a bore 206 of a wafer lift shaft 207. A pneumatic mechanism (not shown) is operable to raise and lower susceptor support shaft 205 and wafer lift shaft 207 to various positions. The pneumatic mechanism (not shown) may also rotate susceptor 201. Rigid pins 209 are slidingly mounted to susceptor 201 and, when not elevated by susceptor 201, are supported by stops 211 of wafer lift shaft 207. Rigid pins 209 may support the wafer when brought into contact with the wafer.

During an exchange phase, a blade 213 carries the wafer into position above pins 209. Subsequently, wafer lift shaft 207 elevates, causing pins 209 to translate upwards and support the wafer. Blade 213 includes a notch 214 to allow room for one of pins 209 that would otherwise collide with blade 213. Once the wafer is supported by pins 209, blade 213 is withdrawn from the reactor 200. Next, susceptor support shaft 205 elevates, causing susceptor 201 to move upwards and come into contact with the wafer. Thereafter, the wafer is supported by susceptor 201. Susceptor support shaft 205 continues to elevate until susceptor 201 and the wafer are level with ring 215. At this point, the wafer and susceptor 201 are in the "process" position. When in the process position, susceptor 201 rotates as heat lamps (not shown) within epitaxial reactor 200 heat the wafer. Additionally, valves (not shown) are opened and closed to release various gases at precise temperatures, pressures, and times. For example, the wafer may undergo a pretreatment process during which a silicon oxide layer is removed from the surface of the wafer.

During the pretreatment process, the epitaxial reactor 200 heats the wafer, using heat lamps (not shown) to 1150 to 1220° C. The heat lamps are controlled to raise the temperature at 3 to about 18° C. per second. Then the chamber of the epitaxial reactor 200 is filled with $H_2$ and the wafer is annealed for 10 to 15 seconds. Next, an epitaxial layer is deposited on the wafer. The chamber of the epitaxial reactor 200 is filled a carrier gas, such as $H_2$, and a silicon-containing gas, for example, $SiHCL_3$, at atmospheric pressure. The wafer surface is maintained at a temperature of at least 900° C. during this process. After a predetermined time, the silicon-containing gas is purged with, for example, $H_2$. The wafer is then heated further, for a predetermined duration, for example 10 seconds. Next the wafer is cooled at a rate of 50° C. per second until it reaches 800° C. During this cooling process, susceptor 201 is lowered such that the wafer is supported only by pins 209. As is apparent, the above-described processes require a plurality of components of epitaxial reactor 200 to be precisely coordinated in order for the process to be carried out correctly.

Figure 3:
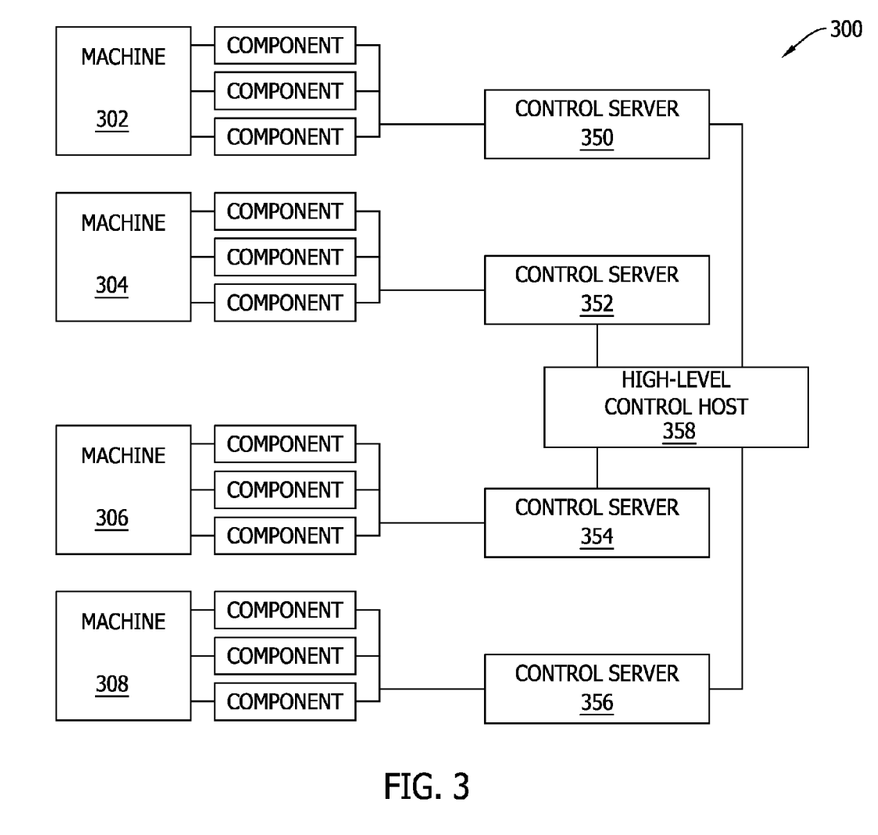
FIG. 3 is a block diagram of a plurality of machines having a plurality of components communicatively coupled to a control server in accordance with an embodiment.

FIG. 3 is a block diagram 300 of a plurality of machines 302, 304, 306, and 308 having a plurality of components 310, 312, 314, 316, 318, 320, 322, 324, 326, 328, 330, and 332 communicatively coupled to a control server 350 in accordance with an embodiment of the present disclosure. Machine 302, is for example, a crystal puller and machines 304, 306, and 308 are, for example, epitaxial reactors. In the embodiment, machines 302, 304, 306, and 308 are used in the generation of silicon wafers in a silicon wafer manufacturing plant. However, those skilled in the art will appreciate that the methods and systems disclosed herein are equally applicable to other processes and other environments, and that the number of machines may vary.

Communicatively coupled to machine 302, which is a crystal puller in this embodiment, are components 314, 316, and 318. Component 314 is a pulling mechanism similar to pulling mechanism 108 (FIG. 1), component 316 is a melt heat exchanger, similar to melt heat exchanger 116 (FIG. 1), and component 318 is a crystal heat exchanger, similar to crystal heat exchanger 122 (FIG. 1). Machines 304, 306, and 308 are epitaxial reactors, similar to epitaxial reactor 200 (FIG. 2). Components 316, 322, and 328 are susceptor support shafts, similar to susceptor support shaft 205 (FIG. 2). Components 318, 324, and 330 are wafer lift shafts, similar to wafer lift shaft 207 (FIG. 2). Components 320, 326, and 332 are gas valves, similar to those discussed with reference to epitaxial reactor 200 (FIG. 2). FIG. 3 is a simplified representation of machines and associated components, and, as is evident from the discussion of crystal puller 100 and epitaxial reactor 200, additional components, including pneumatic mechanisms, heaters, temperature sensors, and pressure sensors are also included as components of one or more of the machines.

A first control server 350 is communicatively coupled to components 310, 312, and 314 of machine 302. A second control server 352 is communicatively coupled to components 316, 318, and 320 of machine 304. A third control server 354 is communicatively coupled to components 322, 324, and 326 of machine 306. A fourth control server 356 is communicatively coupled to components 328, 330, and 332 of machine 308. A high level control host 358 monitors and issues high-level instructions to each of control servers 350, 352, 354, and 356. Control server 350 issues instructions to and receives information from components 310, 312, and 314. For example, control server 350 may instruct component 312, which is a melt heat exchanger, to reach a target temperature. Another component, which is a temperature sensor, provides temperature information to control server 350. Control server 350 also instructs crystal heat exchanger, which is component 314, to reach a target temperature. Another component, which is a temperature sensor for the crystal heat exchanger, provides temperature information to control server 350. Once the target temperature of the melt heat exchanger (component 312) and crystal heat exchanger (component 314) reach their target temperatures, control server 350 instructs puller mechanism to lower a crystal into the melt and begin pulling the crystal out of the melt at a particular rate. Control servers 352, 354, and 356 may simultaneously be issuing instructions and receiving sensor information from epitaxial reactors (machines 304, 306, and 308) to carry out loading of silicon wafers, removal of silicon oxide from the silicon wafers, epitaxial deposition onto the silicon wafers, heating and cooling of the silicon wafers, and/or unloading of the silicon wafers. High level control host 358 may monitor the status of each of control servers 350, 352, 354, and 356, issue high-level commands such as shutting down or starting up any of control servers 350, 352, 354, and 356 and logging any errors.

Figure 4:
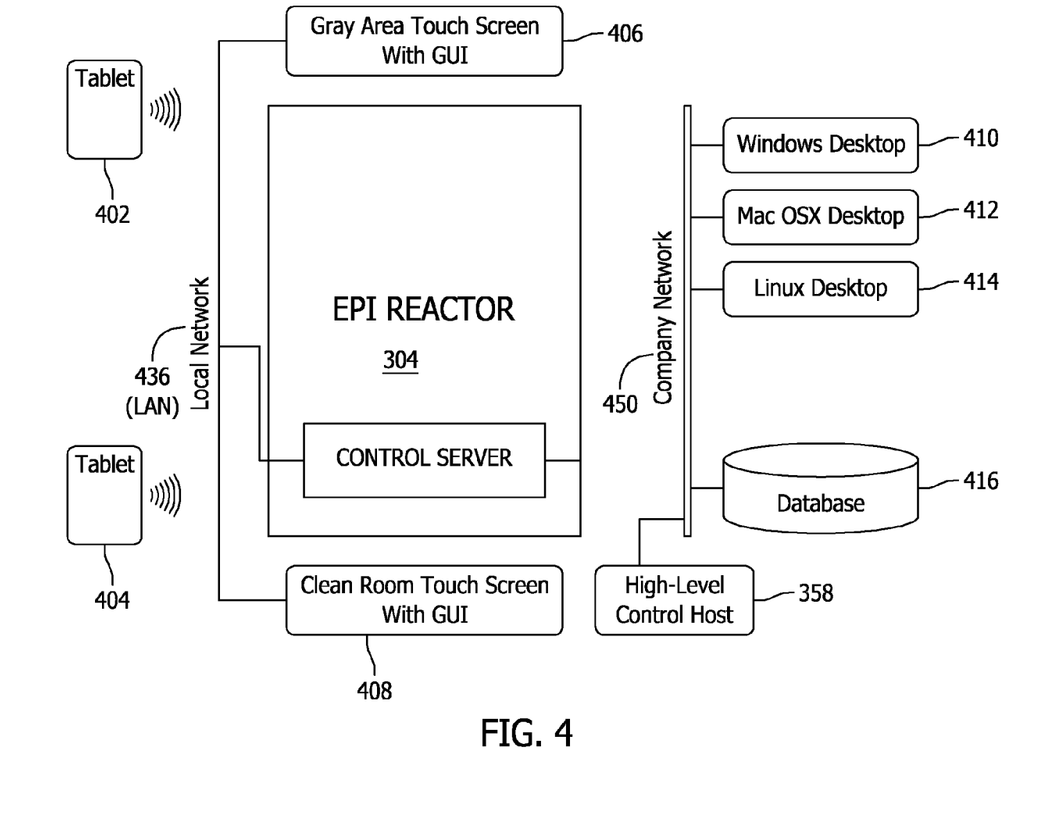
FIG. 4 is a block diagram of a system for controlling components of a machine, in accordance with an embodiment.

FIG. 4 is a block diagram of a system 400 for controlling components of a machine, in accordance with an embodiment of the present disclosure. Components in system 400, identical to components of system 300 (shown in FIG. 3), are identified in FIG. 4 using the same reference numerals used in FIG. 4. System 400 includes control server 352 and machine 304, which is an epitaxial reactor. A disk storage unit containing database 416 company network 450, which may be, for example, a wide area network (WAN). In some embodiments, company network 450 may be accessible through an Internet connection. System also includes a local area network (LAN) 436. Client devices 402 and 404, which are both tablet computing devices, are communicatively coupled to LAN 436 through wireless network connections. Client devices 406 and 408 are physically coupled to LAN 436 through wired connections. Also coupled to LAN 436 is control server 352. Control 352 is communicatively coupled to machine 304, which is an epitaxial reactor, as explained above. Each of client devices 402, 404, 406, and 408 is configured to interact with control server 352 using a user interface, such as a graphical user interface (GUI). Client devices 410, 412, and 414 are also communicatively coupled to control server 352 through company network 450. Client device 410 may be executing a Windows operating system. Client device 412 may be operating, for example, an OS X operating system. Moreover, client device 414 may be operating, for example, a Linux operating system. That is, each of client devices 410, 412, and 414 are able to communicate with control server 352 regardless of the operating system running on the client device. Client devices 402, 404, 406, 408, 410, 412, and 414 may issue instructions to control server 352, such as information regarding processes and steps in the processes ("recipes") for producing products using machine 304 and for receiving status information regarding machine 304 and the components thereof. Database 416 is coupled to company network 450 and may store settings, logs, and other data to enable system 400 to operate as described herein.

In some embodiments, rather than communicating directly with control server 352, one or more of client devices 402, 404, 406, 408, 410, 412, and 416 may communicate with high-level control host 358 (FIG. 3). By communicating with high-level control host 358, rather than directly communicating with control server 352, instructions may be submitted to another control server, for example 350, 354, or 356, depending on the current capacity of each of control servers 350, 352, 354, and 356, as determined by high-level control host 358.

Figure 5:
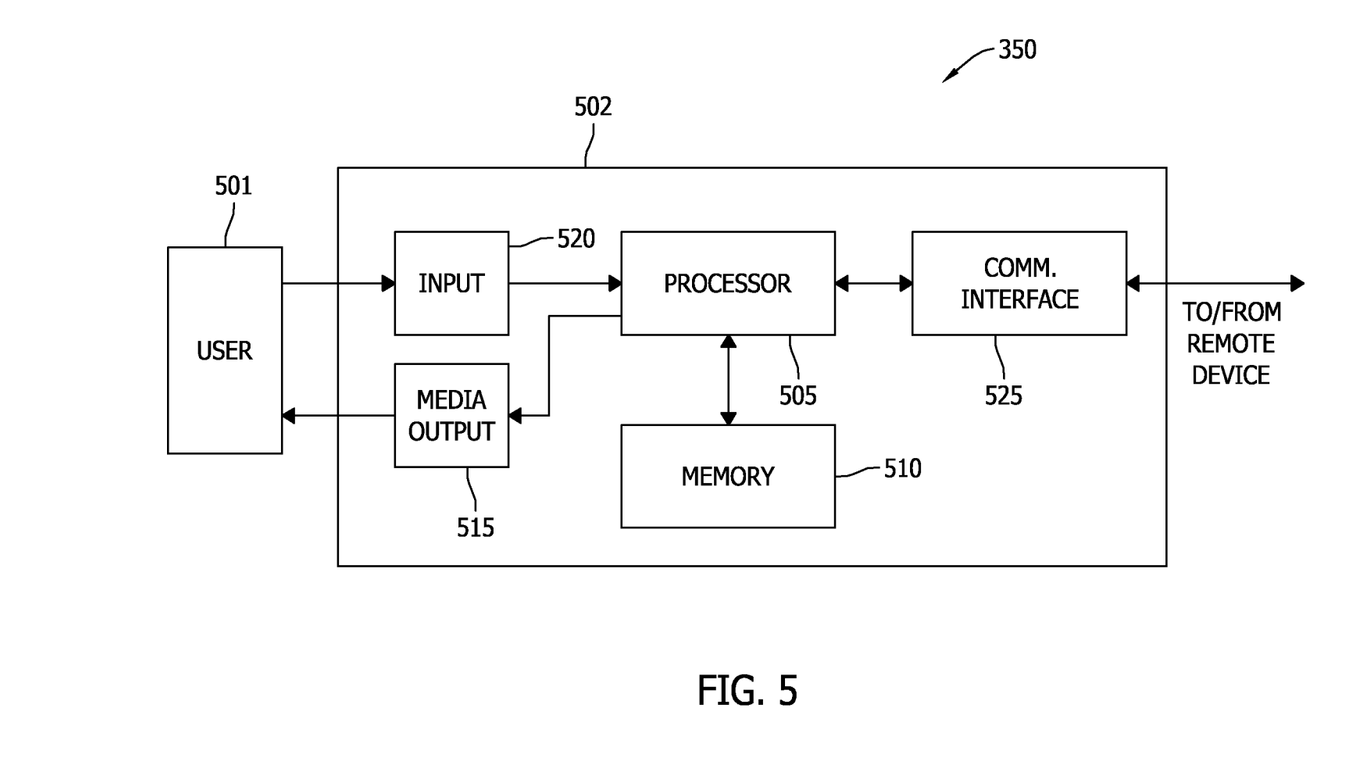
FIG. 5 illustrates a configuration of a computing device in accordance with an embodiment.

FIG. 5 illustrates a configuration of a computing device 502 in accordance with an embodiment of the present disclosure. For example, computing device 502 is representative of any of control servers 350, 352, 354, 356, high-level control host 358, and of any of client devices 402, 404, 406, 408, 410, 412, and 414. Computing device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or data to be stored and retrieved. Memory area 510 may include one or more computer readable storage device or other computer readable media, including transitory and non-transitory computer readable media.

Computing device 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 515.

In some embodiments, computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Computing device 502 may also include a communication interface 525, which is communicatively couplable to a remote computing device such as any of control servers 350, 352, 354, 356, high-level control host 358, and client devices 402, 404, 406, 408, 410, 412, and 414. Communication interface 525 of control servers 350, 352, 354, and 356 are additionally coupled to components of machines 302, 304, 306, and 308 as described above. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, processor-executable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from a server system. A client application allows a user, such as user 501, to display and interact with a server system, such as control server 352, in a manner that does not necessarily involve a web page or website and which may offload more storage and/or processing functions to the client application from the server system.

Memory area 510 may include, but is not limited to, any computer-operated hardware suitable for storing and/or retrieving processor-executable instructions and/or data. Memory area 510 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 510 may include multiple storage units such as hard disks or solid state disks in a redundant array of inexpensive disks (RAID) configuration. Memory area 510 may include a storage area network (SAN) and/or a network attached storage (NAS) system. In some embodiments, memory area 510 includes memory that is integrated in computing device 502. For example, computing device 502 may include one or more hard disk drives as memory 510. Memory area 510 may also include memory that is external to computing device 502 and may be accessed by a plurality of computing devices 502. The above memory types are examples only, and are thus not limiting as to the types of memory usable for storage of processor-executable instructions and/or data.

Control server 350 contains, within memory area 510, processor-executable instructions for executing multiple threads for controlling components of machine 302. Each thread may cause control server 350 to issue instructions to machine 302 for a series of steps (again, a "recipe") for generating a product. The threads executing in control server 350 interact with the components of machine 302 through control objects, embodied in processor-executable instructions in the memory area 510 of control server 350. The control objects are configured and managed in a particular manner that prevents multiple threads from simultaneously accessing and issuing conflicting instructions to a component of a machine 302 and/or causing race conditions or deadlocks, as known in the art of multithreaded processing. The same is true of control servers 352, 354, and 356 and respective machines 304, 306, and 308.

In this description, "lock" or "locking" means setting an exclusive access indicator of a group representative object to indicate that exclusive access is being provided to a single thread, and "unlock" or "unlocking" means setting the exclusive access indicator to indicate that exclusive access in not being provided to a thread. Further, references to locking or unlocking a control object means executing a member function of the control object which causes the above locking or unlocking in a group representative object associated with the control object. Further, references to locking or unlocking a group means executing a member function of one of the control objects in the group to cause the above locking or unlocking in a group representative object associated with the group.

Further, it should be understood that, in embodiments of the present disclosure, multiple copies or instances of group representative objects, control objects, and groups of control objects represented by group representative objects will typically exist in memory area 510 of control server 350 at any given time. Further, and as will be appreciated by those skilled in the art of computer programming, the functions, also known as "member functions", of a group representative object are executed from the perspective the group representative object. Likewise, functions or "member functions" of a control object are executed from the perspective of the control object. It will also be appreciated by those skilled in the art that, while an object-oriented model is used to describe the processor-executable instructions carried out by control server 350, the processor-executable instructions could be organized in any other form, for example a functional-oriented model, to obtain similar results. Further, references to a function being "called" mean that a thread has caused the function to be executed by control server 350. Further, references to a control object or group representative object executing, performing, or carrying out a function mean that a thread has called the function of that particular control object or group representative object.

Figure 6:
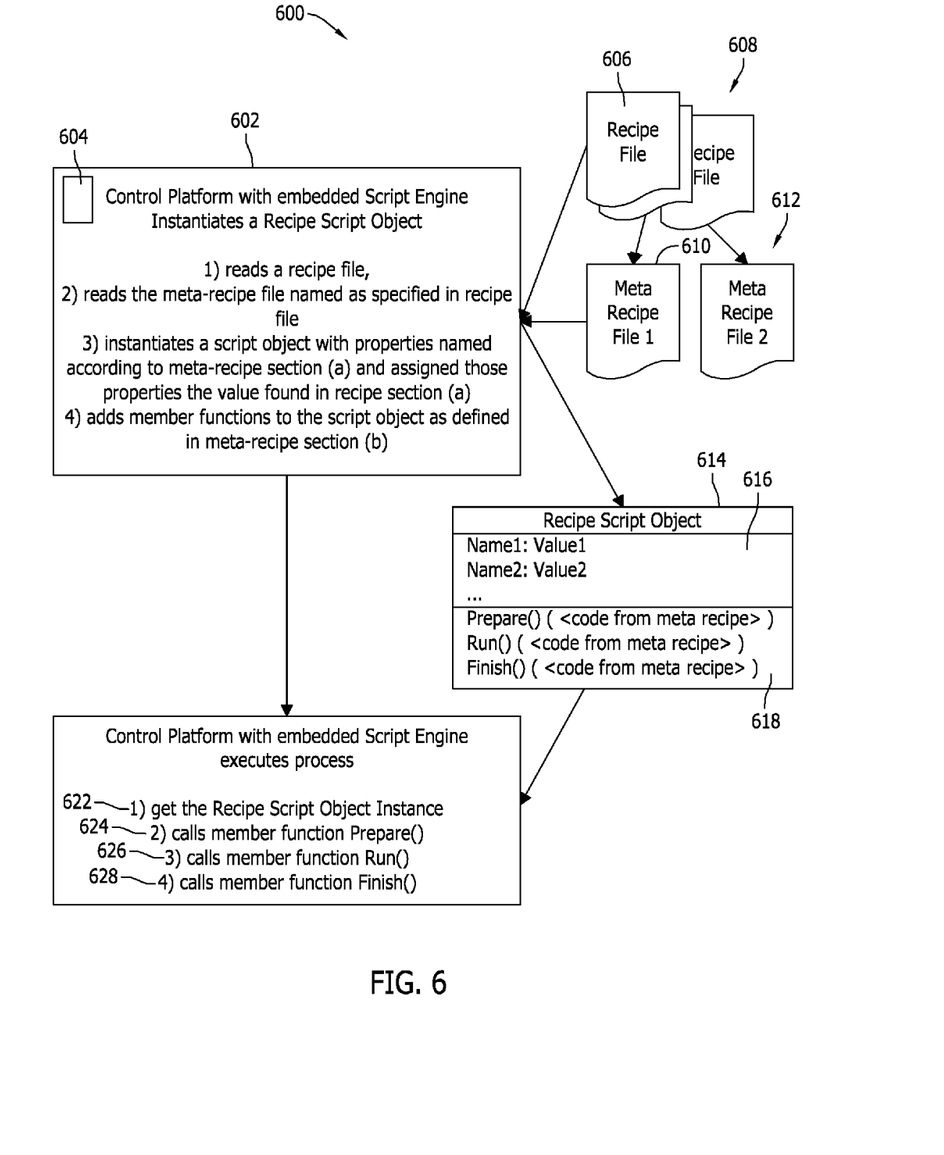
FIG. 6 is a data flow diagram of a machine control operation using a meta-recipe framework in accordance with an embodiment.

FIG. 6 is a data flow diagram of a machine control operation using a meta-recipe framework 600 in accordance with an embodiment of the present disclosure. In the embodiment, a control platform 602 with an embedded script engine 604 instantiates a recipe script object by reading at least one recipe file 606 of a possible plurality of recipe files 608, reading at least one meta-recipe file 610 of a possible plurality of meta-recipe files 612 named as specified in an associated one of the read recipe files 606. Control platform 602 further instantiates a script object 614 with properties named according to a first portion 616 of meta-recipe script object 614 and assigns those properties to the values found in a second portion 618 of meta-recipe script object 614, and adds member functions to meta-recipe script object 614 as defined in second portion 618.

Control platform 602 executes a process 620 that includes getting 622 the recipe script object instance, calling 624 member function Prepare ( ), calling 626 member function Run( ), and calling 628 member function Finish ( ).

Figure 7:
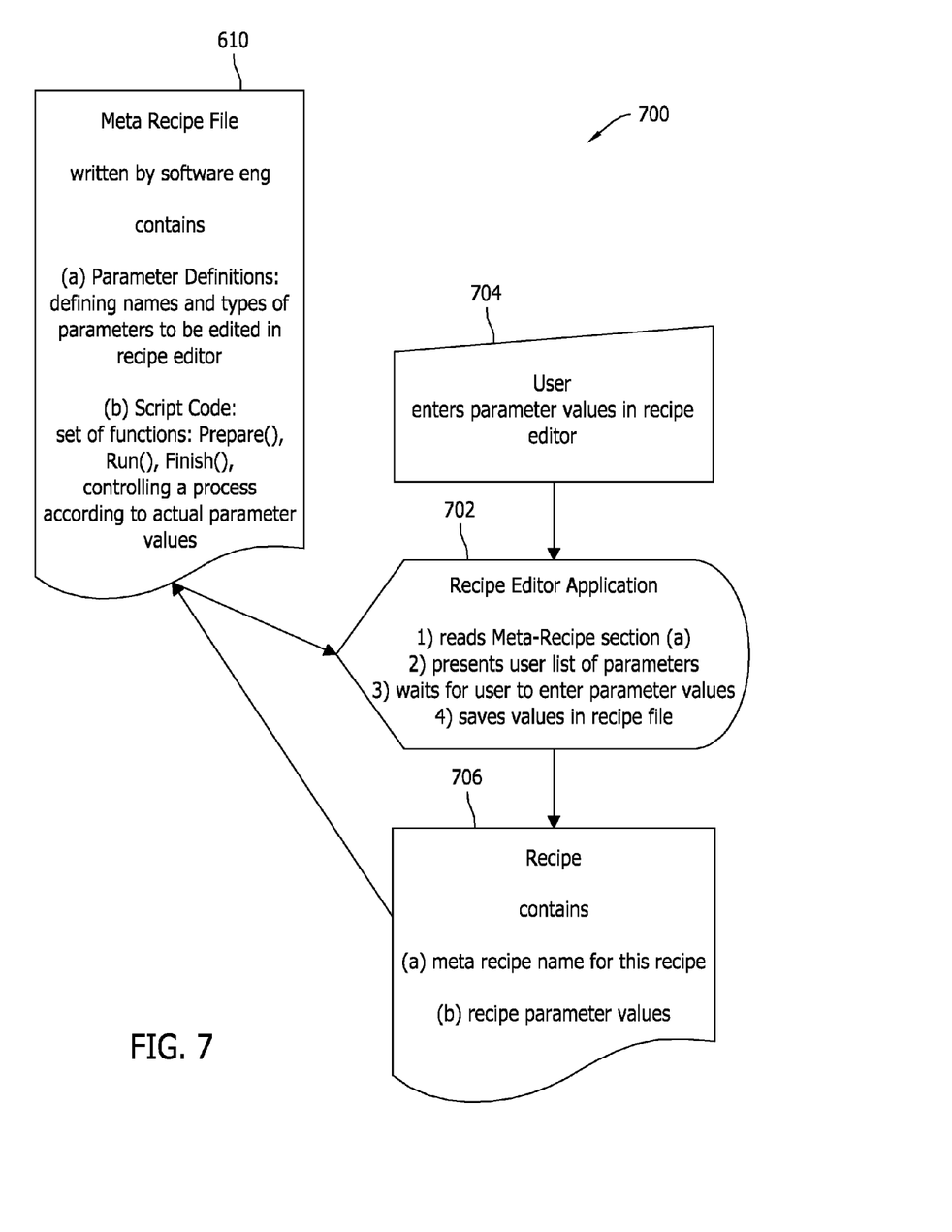
FIG. 7 is a data flow diagram of entering recipe data into a meta-recipe instance in a recipe editor.

FIG. 7 is a data flow diagram 700 of entering recipe data into a meta-recipe instance in a recipe editor 702. Meta recipe file 610 is written by a software engineer and contains (a) Parameter Definitions: defining names and types of parameters to be edited in recipe editor 702, and (b) Script Code: including a set of functions, for example, but not limited to: Prepare( ), Run( ), Finish( ), that control a process according to actual parameter values. Recipe editor application 702 reads first portion 616, presents a user list of parameters, prompts a user 704 to enter parameter values, and saves the entered values in an associated one of recipe files 606.

Figure 8:
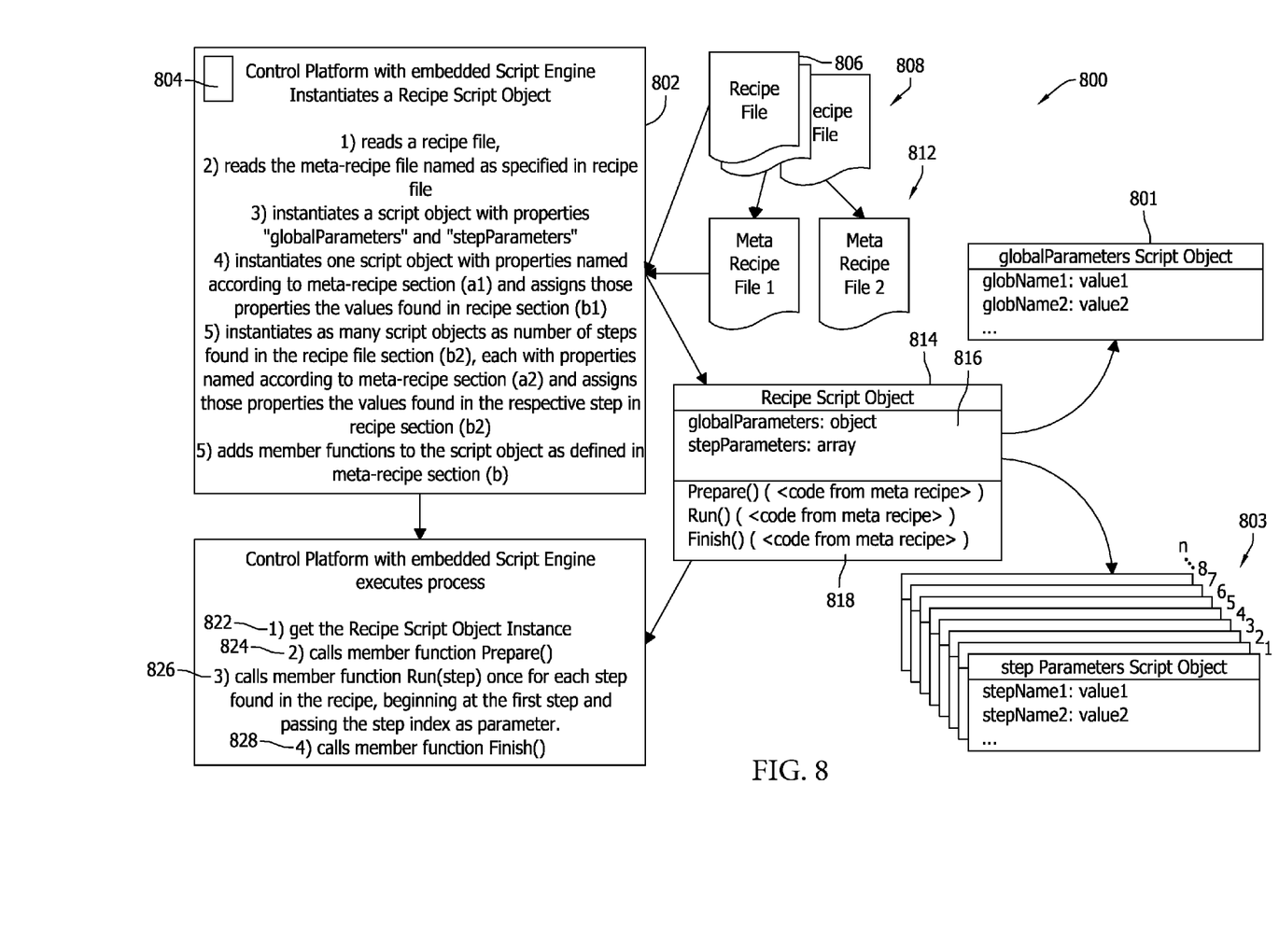
FIG. 8 is a data flow diagram of a machine control operation using a meta-recipe framework in accordance with another embodiment.

FIG. 8 is a data flow diagram of a machine control operation using a meta-recipe framework 800 in accordance with another embodiment of the present disclosure. In the embodiment, a global parameters script object 801 is used with a multi-step parameters script object 803 to define parameters to be used. Control platform 802 and embedded script engine 804 instantiates a recipe script object by reading at least one recipe file 806 of a possible plurality of recipe files 808, reading at least one meta-recipe file 810 of a possible plurality of meta-recipe files 812 named as specified in an associated one of the read recipe files 806. Control platform 802 further instantiates a script object with properties "globalParameters" and "stepParameters", instantiates one script object 814 with properties named according to a first portion 816 of meta-recipe script object 814 and assigns those properties to the values found in a second portion 818 of meta-recipe script object 814, instantiates as many script objects as number of steps (1-n) found in second portion 818, each with properties named according to first portion 816 and assigns those properties the values found in the respective step in second portion 818, and adds member functions to meta-recipe script object 814 as defined in second portion 818.

Control platform 802 executes a process 820 that includes getting 822 the recipe script object instance, calling 824 member function Prepare( ), calling 826 member function Run( ), and calling 828 member function Finish( ).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 505, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is (a) reading a recipe file from a memory associated with a processor configured to control an operation of the machine, the recipe file including operating parameter values for controlling the operation of the machine, (b) extracting a name of a meta-recipe file from the recipe file, the meta-recipe file including a first portion comprising parameter properties of operating parameter values used by the meta-recipe file, (c) receiving values for the meta-recipe having the parameter properties specified in the first portion, and (d) operating the machine using code from a second portion of the meta-recipe and the received values. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system of controlling the operation of a machine provides a cost-effective and reliable means for modifying the operation of the machine for testing, experimentation, or short runs that deviate from an established machine control scheme. More specifically, the methods and systems described herein facilitate run-time changes to the operational control program of the machine using an embedded script engine to receive parameter property specifications and run-time scripted code that is used to control the operation of the machine. As a result, the methods and systems described herein facilitate run-time modification of machine operation in a cost-effective and reliable manner.

An example method and apparatus for controlling an operation of a machine are described above in detail. The apparatus illustrated is not limited to the specific embodiments described herein, but rather, components of each may be utilized independently and separately from other components described herein. Each system component can also be used in combination with other system components.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawing[s] shall be interpreted as illustrative and not in an inhibiting sense.

The invention claimed is:

1. A computer-based method of operating a machine using an embedded script engine, the method using a computer device in communication with the machine, the computer device including a memory, said method comprising:
storing one or more meta-recipe files, the one or more meta-recipe files each including a first portion and a second portion, the first portion including parameter properties of operating parameter values used by a recipe file configured to control the operation of the machine, the second portion including code usable with the recipe file to operate the machine;
reading, by the computer device, the recipe file from the memory, the recipe file including operating parameter values for controlling the operation of the machine;
extracting, by the computer device, a name of a meta-recipe file of the one or more meta-recipe files from the recipe file, the meta-recipe file including a first portion comprising parameter properties of operating parameter values used by the meta-recipe file;
receiving values for the meta-recipe having the parameter properties specified in the first portion; and
operating the machine using a control application that employs run-time modifiable code to provide a framework to control process execution from a high level with embedded scripting, the run-time modifiable code from a second portion of the meta-recipe and the received values.

2. The method of claim 1, wherein reading a recipe file comprises reading a recipe file including parameter definitions and the actual high level code that controls process execution according to the parameters defined by the meta-recipe file.

3. The method of claim 1, wherein reading a recipe file comprises:
reading in a meta-recipe file corresponding to the recipe file;
parsing high level code in the meta-recipe file;
instantiating the high level code; and
executing the process by calling that code with the parameter values contained in the recipe.

4. The method of claim 1, further comprising receiving a recipe file written for a specific meta-recipe file, the meta-recipe name associated with recipe file is stored in the recipe file.

5. The method of claim 1, reading in a meta-recipe file comprises reading in one or more meta-recipe files.

6. The method of claim 1, wherein receiving values for the meta-recipe comprises:
reading in a meta-recipe file using a recipe editor;
defining a data-receiving template for the recipe editor using the parameter definitions in the meta-recipe file; and
receiving values for the meta-recipe corresponding to the parameter definitions.

7. A computer system for computerized coordination of multiple operations to be performed by components of machines using a recipe file, the computer system comprising:
a memory device for storing data; and
a computer-controlled machine comprising a processor in communication with the memory device, said processor programmed to:
store a meta-recipe file, the meta-recipe file comprising a first portion and a second portion, the first portion comprising parameter properties of operating parameter values used by the recipe file, the second portion comprising code usable with the recipe file to operate the machine;
read the recipe file from the memory device, the recipe file including operating parameter values for controlling the operation of the machine;
extract a name of a meta-recipe file from the recipe file;
receive values for the named meta-recipe file having the parameter properties specified in the first portion; and
operate the machine using a control application that employs run-time modifiable code to provide a framework to control process execution from a high level with embedded scripting, the run-time modifiable code from the second portion of the meta-recipe file and the received values.

8. The system of claim 1, wherein said processor is further programmed to read a meta-recipe file including parameter definitions and the actual high level code that controls process execution according to the parameters defined by the meta-recipe file.

9. The system of claim 1, wherein said processor is further programmed to:
read in a meta-recipe file corresponding to the recipe file;
parse high level code in the meta-recipe file;
instantiate the high level code; and
execute the process by calling that code with the parameter values contained in the recipe.

10. The system of claim 1, wherein said processor is further programmed to receive a recipe file written for a specific meta-recipe file, the meta-recipe name associated with recipe file is stored in the recipe file.

11. The system of claim 1, wherein said processor is further programmed to read in a plurality of meta-recipe files.

12. The system of claim 1, wherein said processor is further programmed to:
reading in a meta-recipe file using a recipe editor;
defining a data-receiving template for the recipe editor using the parameter definitions in the meta-recipe file; and
receiving values for the meta-recipe corresponding to the parameter definitions.

13. One or more non-transitory computer-readable storage media having computer-executable instructions embodied thereon, wherein when executed by at least one processor, the computer-executable instructions cause the processor to:
store one or more meta-recipe files, the one or more meta-recipe files each including a first portion and a second portion, the first portion including parameter properties of operating parameter values used by a recipe file configured to control the operation of the machine, the second portion including code usable with the recipe file to operate the machine;
read a recipe file from a memory associated with a processor configured to control an operation of the machine, the recipe file including operating parameter values for controlling the operation of the machine;
extract a name of a meta-recipe file from the recipe file, the meta-recipe file including a first portion comprising parameter properties of operating parameter values used by the meta-recipe file;
receive values for the meta-recipe having the parameter properties specified in the first portion; and
operate the machine using a control application that employs run-time modifiable code to provide a framework to control process execution from a high level with embedded scripting, the run-time modifiable code from a second portion of the meta-recipe and the received values.

14. The computer-readable storage media of claim 13, wherein the computer-executable instructions further cause the processor to read a meta-recipe file including parameter definitions and the actual high level code that controls process execution according to the parameters defined by the meta-recipe file.

15. The computer-readable storage media of claim 13, wherein the computer-executable instructions further cause the processor to:
read in a meta-recipe file corresponding to the recipe file;
parse high level code in the meta-recipe file;
instantiate the high level code; and
execute the process by calling that code with the parameter values contained in the recipe.

16. The computer-readable storage media of claim 13, wherein the computer-executable instructions further cause the processor to receive a recipe file written for a specific meta-recipe file, the meta-recipe associated with recipe file is stored in the recipe file.

17. The computer-readable storage media of claim 13, wherein the computer-executable instructions further cause the processor to:
read in a meta-recipe file using a recipe editor;
define a data-receiving template for the recipe editor using the parameter definitions in the meta-recipe file; and
receive values for the meta-recipe corresponding to the parameter definitions.

* * * * *